Aug. 29, 1961  R. E. WAUGH ET AL  2,998,342
HONEYCOMB PANEL
Filed June 7, 1956  2 Sheets-Sheet 1

INVENTOR
Robert E. Waugh
Osborne L. Rider

BY

ATTORNEYS

Aug. 29, 1961    R. E. WAUGH ET AL    2,998,342
HONEYCOMB PANEL
Filed June 7, 1956    2 Sheets-Sheet 2
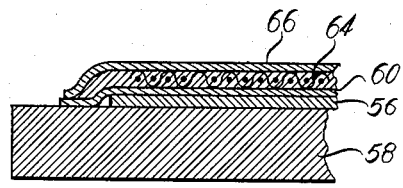
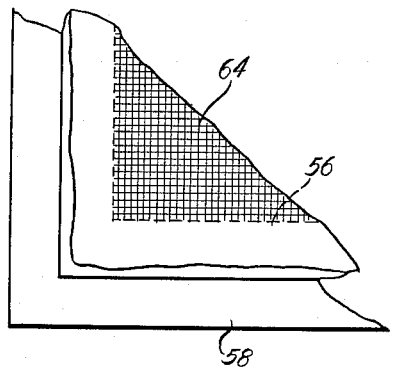
INVENTORS
Robert C. Waugh
Osborne L. Rider
BY Diggins & LeBlanc
ATTORNEYS United States Patent Office 2,998,342
Patented Aug. 29, 1961

2,998,342
HONEYCOMB PANEL
Robert E. Waugh and Osborne L. Rider, Baltimore, Md., assignors to The Englander Company, Inc., Baltimore, Md., a corporation of Delaware
Filed June 7, 1956, Ser. No. 590,048
1 Claim. (Cl. 154—128)

This invention relates to a honeycomb panel and more particularly relates to a reinforced honeycomb panel for structural use.

Honeycomb panels made by sandwiching sinuous ribbons assembled in honeycomb form between a pair of sheets of laminate have recently come into widespread use for a large variety of structural purposes. Not only have such panels been used in sheet form but they have also been molded into complex shapes such as domes and ovoids and used as covers or as structural support members.

Generally speaking these panels have been formed of fiberglass reinforced plastic sheets and an inner honeycomb structure formed by cementing sinuous ribbons together and then joining the sheets to the honeycomb structure by suitable adhesive. The panels thus formed have generally been more or less opaque, having the cloth-like appearance of the reinforcing glass, and, because of variation in thickness of the sheets and variation in width of the ribbons from which the honeycomb is formed, there has been a considerable variation in the strength and tightness of the joints between the edges of the honeycomb ribbons and the surface sheets.

As a means of overcoming this difficulty it has been customary to utilize ribbons having frayed edges and to use somewhat of an excess of adhesive at the ribbon edges in order to insure some bond at all positions. While this generally provides at least some adhesive between all edges of the honeycomb ribbons and the inner surface of the sheets it also causes the formation of unsightly non-uniform beads of cement along the frayed edges of the ribbons. This produces an adhesive line of varying thickness, although with conventional panels this is at least partially hidden by the opaque nature of the laminate sheets. Because of the cloth-like appearance and uneven adhesive lines conventional honeycomb panels are generally given a surface coating where used in a visible application.

We have found that a further cause of weakness in conventional panels of this type is that most of the adhesives used contain volatiles which volatilize into the sealed honeycomb spaces where they are trapped. These trapped volatiles then tend to soften the honey comb and surface sheets.

In many applications, as for instance in the Dichromatic Panel disclosed in assignee's copending application Serial No. 563,257, filed February 3, 1956, and now abandoned, it is desirable to have honeycomb panels which are translucent, decorative, attractive and functional, but which still possess all the structural rigidity heretofore available in conventional honeycomb panels. In order to accomplish this it is desirable to eliminate or suppress the impregnated cloth appearance and the unsightly uneven adhesive lines which criss-cross conventional panels.

It is accordingly a primary object of the present invention to provide a glass reinforced honeycomb panel having translucent surface sheets and having uniform adhesive lines which, for practical purposes, are of a width substantially equal to the width of the ribbon forming the honeycomb.

It is another object of the invention to provide a honeycomb panel having high and uniform structural strength, which needs no surface coating in order to present a pleasing appearance.

It is another object of the invention to provide a honeycomb panel wherein the strength of the panel is substantially uniform over the entire area of the panel due to a substantially uniform bond between the honeycomb ribbon and the surface sheets.

These and further objects and advantages of the invention will become apparent upon reference to the appended specification and claim and appended drawings wherein:

FIGURE 5 is a vertical cross section showing a surface sheet layup; and

FIGURE 6 is a plan view of the surface sheet layup of FIGURE 5.

Figure 2:
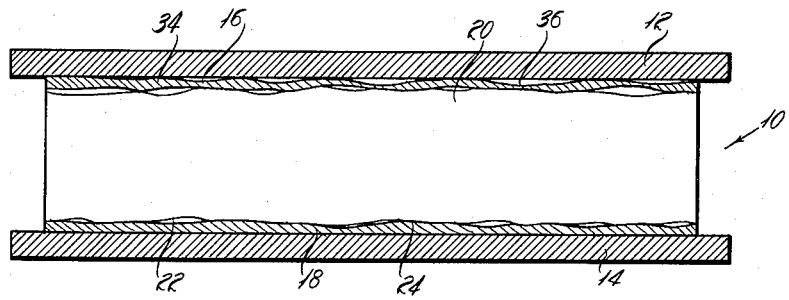
FIGURE 2 is a vertical section of the panel of FIGURE 1 showing in exaggerated form the effect of variation in width of the honeycomb ribbons and the variation in thickness of surface sheets.

Referring to FIGURE 2 of the drawing there is shown a conventional honeycomb panel 10 in the process of being assembled between a pair of steel platens 12 and 14 which force the surface sheets 16 and 18 into engagement with the honeycomb ribbons 20. Variations in width of the ribbons 20 and variations in thickness of the surface sheets 16 and 18 are exaggerated in order to illustrate the effect of such variations on bond strength and panel appearance. In order to provide as complete a bond as possible between the ribbon and the surface sheets it is customary to use a substantial surplus of adhesive along the edges of the ribbon so as to provide a seal at positions such as 22 where the edge of the ribbon does not contact the adjacent flat surface sheet. Generally this bonding is accomplished in two stages wherein both the surface sheet and the ribbon edges are coated with adhesive prior to joining. Referring to FIGURE 2 it will be seen that when this relatively large amount of adhesive is utilized to provide for a bond at narrow ribbon points, such as 22, the wider portions of the ribbon, as shown at 24, cause a squeezing or bulging out of the adhesive to form a much wider bond area than is present at positions such as 22.

Figure 1:
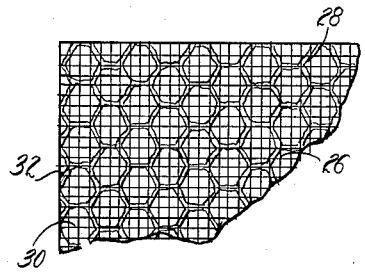
FIGURE 1 is a plan view of a conventional honeycomb panel showing the appearance of the reinforcing fabric and the adhesive lines.

FIGURE 1 illustrates the effect of this on the plan view appearance of panels thus manufactured. Thus referring to FIGURE 1 it will be seen that certain portions of the adhesive line such as 26 are quite thick whereas other portions such as 28 are quite thin. At still other positions it not infrequently happens that the adhesive line is non-existent as is shown at 30. This unevenness is accentuated by the fact that the edges of the honeycomb ribbon as supplied by the manufacturer are purposely rough and jagged so that almost the entire adhesive line has a ragged appearance. Adding to this difficulty is the fact that the laminate surface sheets are rarely of a completely uniform thickness and possess thin spots as shown in exaggerated form at 34 and 36 in FIGURE 2.

In addition to the foregoing the plan view of a conventional glass reinforced honeycomb panel presents a fabric like appearance, as shown at 32, and this normally calls for a surface coating where the surface of the mounted panel is exposed to view. Because of this opaque appearance, it is impossible to use panels of this nature for illumination or decoration as disclosed in assignee's copending application Serial No. 563,257, filed February 3, 1956, and now abandoned.

Figure 3:
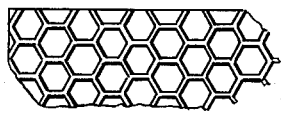
FIGURE 3 is a plan view showing a honeycomb panel constructed according to the present invention.

According to the present invention it has been found that in order to manufacture a honeycomb panel having a uniform appearance as well as a substantially uniform bond strength it is necessary to trim the ribbons to a substantially uniform width and to cut the ribbons to a sharp edge with no ragged fringes. The elimination of ragged edges and the provision of a uniform width eliminates most of the difficulties encountered in the conventional fabrication process as illustrated in FIGURES 1 and 2, although there still remains the problem of variation in thickness of the laminate surface sheets. We have now found that this problem may be substantially eliminated if the panel is assembled between a pair of platens 36 and 38 which are surfaced with soft rubber pads 40 and 42 for engaging the surface sheets 44 and 46. The pads 40 and 42 cause the surface sheets 44 and 46 to flex into engagement with the sharp straight edges 48 and 50 of the honeycomb ribbons 52 so that a uniform adhesive bond of even thickness may be obtained, as shown in FIGURE 3.

While panels produced in the foregoing manner using conventional reinforced surface sheets are free from unsightly uneven adhesive lines and the panel weakness which results therefrom, they are still possessed of the opaque fabric appearance of the reinforcing element. We have now discovered that this appearance may be largely eliminated by utilizing for the surface sheets a light stabilized resin which is transparent and which has an index of refraction substantially equal to the index of refraction of the glass fabric. Surface sheets fabricated in this manner are found to be quite translucent and, in conjunction with the unique and attractive honeycomb appearance of the honeycomb ribbons with their uniform and practically invisible adhesive lines, present an attractive surface appearance well suited to use without a surface covering. By selecting the color of the surface sheets and honeycomb ribbons, panels of this nature are well adapted to use for illumination and decoration such as the Dichromatic Panels disclosed in assignee's copending application Serial No. 563,257, now abandoned.

In the fabrication of conventional honeycomb panels, as shown in FIGURES 1 and 2, the excess adhesive which bulges around the area of contact of the ribbon and surface sheets normally contains a volatile solvent which evaporates during use. We have found that these volatiles are trapped in the honeycomb spaces and weaken and sometimes discolor both the honeycomb ribbons and the surface sheets. Having discovered the cause of this weakening and discoloration we have further found that this may be substantially eliminated by utilizing an adhesive comprising 100% solids and containing no volatile by-products. Substantially transparent epoxy resins are quite suited to this use.

Conventional reinforced fabric surface sheets generally contain small air bubbles in the fabric and these not only contribute to the opaque appearance of the sheets but also deleteriously affect its strength. We have found that these difficulties may be eliminated and strong translucent sheets produced if, in the process of forming said sheets, a gas tight dam is formed therearound to completely seal off the fabric material. This is accomplished, according to one feature of the invention, by manufacturing the surface sheets in the following manner:

Referring to FIGURES 5 and 6, a soft pad such as foam rubber latex or plastic foam 56 is laid upon a table or platen 58 and is covered with a thin film of a smooth surfaced material 60 such as cellophane or "Mylar," which may be fastened to the table by means of adhesive or plastic tape. The reinforcing fabric 62, which is preferably a fiber glass fabric, is then laid upon the film 60 and is of such a size as to leave a border 64 where the fabric does not cover the pad 56. A light stabilized resin having an index of refraction substantially equal to that of the glass fabric is then deposited on the fabric. This resin may be any polyester which satisfies the foregoing requirements, such as the commercial resins sold as "Laminac 4192" and "Rohm and Haas P-444." A second film 66 is then laid over the resin and the layup pressed to fully impregnate the fabric and to squeeze all air out from between the films 56 and 66. The fabric has been found to have a tendency to suck air into the resin by a capillary wick type phenomenon. In order to prevent this and the ensuing opacity which it causes the resin is provided in excess so that upon pressing it spreads beyond the edges of the fabric to form a resin dam in the border 64, which completely isolates the fabric from the surrounding air. After pressing the resin is cured, the films 56 and 66 are stripped from the resin surface, and the border 64 is trimmed back to the fabric. The resulting sheet has smooth surfaces, is translucent, and is substantially completely free of air bubbles. The pressing may be carried out between platens and the upper film may be attached to the upper platen by adhesive or plastic tape. If the platen surfaces are sufficiently smooth and possess a good release the films may be dispensed with. In one preferred embodiment a cellophane sheet is used on one side while "Mylar" is used on the other side and the honeycomb is bonded to the cellophane side.

The fabric is preferably a light weight glass fabric, such as 2200 or 150-128 fabric, these terms being United Merchant's designations well understood to those skilled in the art. These materials are treated with a chromyl chloride wetting agent such as the agents marketed under the trade-names of Volan or Volan A. The use of heavier or tighter fabrics is generally to be avoided as these do not readily impregnate to the high degree desired for maximum translucency. The wetting agent is flash dried on the fabric before it can hydrolyize.

Figure 4:
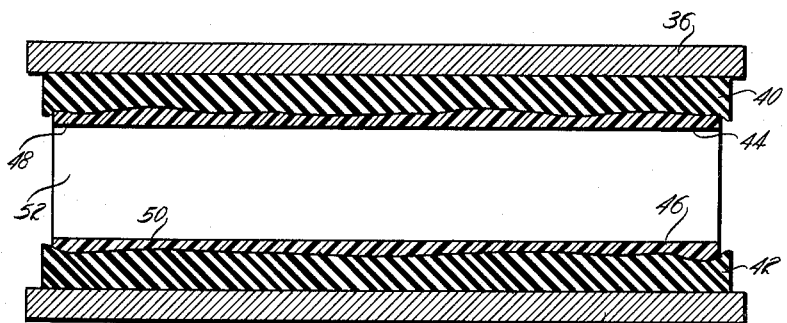
FIGURE 4 is a vertical section showing the assembly of a honeycomb panel according to the present invention.

After the surface sheets have been prepared ribbons of metal, plastic, paper, coated fabric, or the like are formed into a honeycomb structure. Pre-formed honeycomb of various materials is commercially available in various widths and ordinarily commercial honeycomb is used. The honeycomb is then trimmed or cut to width by means of sharp knives which produce sharp edges. In certain instances it may be found desirable to sand the edges of the assembled honeycomb in order to still further provide uniformity of width and sharpness of the edges. A substantially transparent 100% solid adhesive such as an epoxy resin is then applied to the edges of the honeycomb structure. This is preferably done by passing the open honeycomb between rolls carrying the adhesive so that a uniform amount of adhesive is applied over the entire edge. The honeycomb is then sandwiched between the surface sheets and pressed between a pair of platens having surface pads of a soft resilient material such as foam rubber, as shown in FIGURE 4. The panel thus assembled is held in the press for a time sufficient to allow curing of the adhesive and is then released and removed in a completely finished condition.

The panel is possessed of a clear translucent appearance, has uniform substantially invisible adhesive lines and possesses a relatively uniform strength over its entire area. Because of its translucent, clear appearance it is possible to utilize the panels in colored or transparent form without a surface coating for structural, decorative or other purposes.

It will thus be apparent that through the various process steps described in detail hereinabove we are able to produce a reinforced honeycomb panel markedly superior to conventional panels in strength and appearance and suited to uses which could not be fulfilled by currently available panels of this general type.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed and desired to be secured by United States Letters Patent is:

A method of fabricating honeycomb panels comprising the steps of treating a light weight glass fabric with chromyl chloride, impregnating said fabric with a polyester resin having an index of refraction substantially equal to that of the glass fabric to form a pair of surface sheets, trimming a honeycomb structure to a uniform thickness with sharp unfrayed edges, coating said edges with a uniform layer of epoxy resin which comprises substantially 100 percent solids, and pressing said surface sheets onto said honeycomb between a pair of soft resilient pads.

References Cited in the file of this patent

UNITED STATES PATENTS

| | | |
|---|---|---|
| 2,311,613 | Slayter | Feb. 16, 1943 |
| 2,477,852 | Bacon | Aug. 2, 1949 |
| 2,544,667 | Goebel et al. | Mar. 13, 1951 |
| 2,613,397 | Borkland | Oct. 14, 1952 |
| 2,642,920 | Simon et al. | June 23, 1953 |
| 2,643,699 | Krueger | June 30, 1953 |
| 2,644,777 | Havens | July 7, 1953 |
| 2,731,376 | Rusch | Jan. 17, 1956 |
| 2,742,387 | Guiliani | Apr. 17, 1956 |
| 2,743,207 | Rusch | Apr. 24, 1956 |
| 2,828,235 | Holland et al. | Mar. 25, 1958 |